(12) United States Patent
Reynders et al.

(10) Patent No.: US 7,824,547 B2
(45) Date of Patent: Nov. 2, 2010

(54) FILTER ARRANGEMENT

(75) Inventors: Luc Reynders, Riemst (BE); Marcel Peumans, Riemst (BE)

(73) Assignee: Mann + Hummel GmbH, Ludwigsburg (DE)

( * ) Notice: Subject to any disclaimer, the term of this patent is extended or adjusted under 35 U.S.C. 154(b) by 226 days.

(21) Appl. No.: 11/515,719

(22) Filed: Sep. 6, 2006

(65) Prior Publication Data

US 2007/0051672 A1 Mar. 8, 2007

(30) Foreign Application Priority Data

Sep. 6, 2005 (DE) .................. 10 2005 042 412

(51) Int. Cl.
*F01M 11/03* (2006.01)
(52) U.S. Cl. .................. 210/171; 210/167.09; 210/391; 210/400; 210/409; 210/525; 210/297; 210/298
(58) Field of Classification Search ........................ None
See application file for complete search history.

(56) References Cited

U.S. PATENT DOCUMENTS

| | | | | |
|---|---|---|---|---|
| 603,945 | A * | 5/1898 | Edgerton | 100/73 |
| 1,332,305 | A * | 3/1920 | Ross | 209/307 |
| 3,197,030 | A * | 7/1965 | Black | 210/400 |
| 3,204,773 | A * | 9/1965 | Lind | 210/525 |
| 3,206,030 | A * | 9/1965 | Estabrook | 210/97 |
| 3,332,553 | A * | 7/1967 | Casson | 210/103 |
| 3,455,457 | A * | 7/1969 | Popelar | 210/167.04 |
| 3,464,563 | A * | 9/1969 | Gonzalez et al. | 210/400 |
| 3,506,128 | A * | 4/1970 | Pashaian et al. | 210/400 |
| 3,570,674 | A * | 3/1971 | Dahlem | 210/400 |
| 3,784,017 | A * | 1/1974 | Arnold et al. | 210/354 |
| 3,840,120 | A * | 10/1974 | Greenberg | 210/167.31 |
| 3,901,809 | A * | 8/1975 | Ball et al. | 210/387 |
| 4,242,205 | A | 12/1980 | Hirs | |
| 4,390,428 | A * | 6/1983 | Bratten | 210/400 |
| 4,440,642 | A | 4/1984 | Frese et al. | |
| 4,470,905 | A * | 9/1984 | Pangburn et al. | 210/136 |
| 4,693,836 | A | 9/1987 | Willson | |
| 5,167,839 | A * | 12/1992 | Widmer et al. | 210/784 |
| 5,217,613 | A * | 6/1993 | Tashiro et al. | 210/396 |

(Continued)

FOREIGN PATENT DOCUMENTS

EP 0 069 980 B1 1/1983

(Continued)

OTHER PUBLICATIONS

European Search Report dated Nov. 7, 2006 with an English translation of the pertinent portion (three (3) pages).

(Continued)

*Primary Examiner*—Robert James Popovics

(57) ABSTRACT

A filter apparatus, particularly for filtering coolant/lubricant from a machining, including a filter tank having an inlet for the liquid to be filtered, an outlet for the filtered liquid and a belt of filter medium adapted to circulate within the filter tank and having a top side and a bottom side. The liquid to be filtered is introduced below the bottom side and is discharged between the top side and the bottom side. The filter material of the bottom side separates the unfiltered liquid from the filtered liquid and prevents floating particles in the liquid from reaching the outlet for the filtered liquid.

8 Claims, 3 Drawing Sheets

U.S. PATENT DOCUMENTS

| | | | | |
|---|---|---|---|---|
| 5,256,290 | A * | 10/1993 | Becker et al. | 210/400 |
| 5,601,729 | A * | 2/1997 | Bratten | 210/783 |
| 5,961,847 | A * | 10/1999 | Creps et al. | 210/783 |
| 6,042,726 | A | 3/2000 | Anderson | |
| 6,066,255 | A | 5/2000 | Anderson | |
| 6,093,315 | A * | 7/2000 | Croket | 210/167.02 |
| 6,260,716 | B1 * | 7/2001 | Fontaine et al. | 210/525 |
| 6,332,983 | B1 | 12/2001 | Tashiro et al. | |
| 6,358,406 | B1 * | 3/2002 | Hirs | 210/90 |
| 6,475,377 | B1 * | 11/2002 | Fox et al. | 210/90 |
| 6,612,445 | B2 * | 9/2003 | Bratten | 209/272 |
| 6,685,830 | B2 * | 2/2004 | Hartleitner et al. | 210/262 |
| 6,835,315 | B2 * | 12/2004 | Fox et al. | 210/739 |
| 6,953,524 | B2 * | 10/2005 | Woodbridge et al. | 210/97 |
| 7,364,652 | B2 * | 4/2008 | Middleton | 210/158 |
| 2002/0139722 | A1 * | 10/2002 | Bratten | 209/272 |
| 2004/0050805 | A1 * | 3/2004 | Hartleitner et al. | 210/800 |
| 2004/0262242 | A1 * | 12/2004 | Middleton | 210/783 |
| 2007/0051672 | A1 * | 3/2007 | Reynders et al. | 210/167.09 |

FOREIGN PATENT DOCUMENTS

| | | |
|---|---|---|
| EP | 0 244 151 B1 | 8/1993 |
| EP | 1 053 825 A2 | 11/2000 |
| JP | 2003-33770 A | 2/2003 |
| WO | WO 93/11850 A1 | 6/1993 |

OTHER PUBLICATIONS

Extended European Search Report dated Mar. 6, 2007 with English translation of relevant portion (ten (10) pages).

* cited by examiner

FILTER ARRANGEMENT

BACKGROUND OF THE INVENTION

The present invention relates to a filter apparatus, particularly for coolant/lubricant from machining operations, comprising a filter tank having an inlet for the liquid to be filtered and an outlet for the filtered liquid and having a belt of filter medium adapted to circulate within the filter tank.

U.S. Pat. No. 4,693,836 (=EP 244,151) discloses a filter apparatus. This apparatus has a filter tank with an inlet for the unfiltered liquid and an outlet chamber in the bottom of the filter tank. A belt of filter medium is disposed between the filter tank and the outlet chamber. This belt of filter medium is adjacent a chain flight assembly extending through the filter tank. The object of such apparatuses is to filter liquid contaminated with chips or swarf, for example. Usually, the dirt particles in the liquid sink to the bottom where they are carried along by the chain flight assembly and the belt of filter material and discharged through a discharge neck. Chips created in industrial operations are partly fine and float on top of the liquid, which means that such chips are difficult to remove and discharge from the liquid.

SUMMARY OF THE INVENTION

The object of the invention is to improve a prior art filter apparatus so that it is capable of removing from the liquid even small and/or light chips.

Another object of the invention is to provide a filter apparatus which is particularly suitable for removing chips of aluminum, magnesium or other materials that tend to float on a liquid from that liquid.

These and other objects are achieved in accordance with the present invention by providing a filter apparatus comprising a filter tank having an inlet for a liquid to be filtered and an outlet for filtered liquid; and a belt of filter medium adapted to circulate within the filter tank and comprising a top side and a bottom side; wherein the liquid to be filtered is introduced to the tank below the bottom side of the belt, and outlet openings are provided between the top side and the bottom side of the belt, and wherein the filter medium of the bottom side of the belt separates unfiltered liquid from the filtered liquid and guides the filtered liquid through the outlet openings to the outlet for filtered liquid.

An advantage of the invention is that the liquid is cleaned dynamically by the belt of filter medium. The chip separation capacity of such a filter apparatus, which is also referred to as an overflow separator, is highly reliable. The term "filtered liquid" should also be understood to refer to a liquid which may still contain some dirt particles, but from which coarse dirt particles have been removed because it has passed through the belt of filter medium.

According to one embodiment of the invention a cleaning device is provided for the belt of filter medium. This device is disposed above the liquid level and is comprised of spray nozzles that are arranged on a common nozzle head or rail and that serve to clean the dirt off the filter medium belt. The filter medium belt is driven by a motor, which is also disposed above the liquid level.

In one preferred embodiment, flight bars are provided on the filter medium belt to ensure that dirt of any kind is carried away by the filter medium belt. The flight bars are arranged perpendicularly to the direction of movement of the filter medium belt. Dirt, chips, and the like as well swarf typically settle in the bottom of the filter tank. To discharge this dirt, a chain flight assembly is advantageously disposed inside the filter tank. It transports the dirt out of the liquid in upward direction along a slope of the filter wall, or a so-called discharge neck, from where it travels through a chute into a collecting basin.

The chain flight assembly is provided with a drive motor, which advantageously is disposed in the area of the discharge neck. A cleaning device for the unit may also be provided in the area of the discharge neck. This cleaning device again is comprised of a spray head with a plurality of spray nozzles.

In another embodiment of the invention, the belt of filter medium is equipped with flight bars. As used herein, the term "flight bars" should be understood to mean strips or movable webs that ensure that the dirt is reliably transported in a specific direction within the filter apparatus.

In still another embodiment of the invention a chain flight assembly is provided inside the filter tank. The construction of this flight assembly is similar to the one described in U.S. Pat. No. 4,693,836, except it does not have a belt of filter medium but only flight bars that ensure that the dirt which collects on the bottom is discharged.

It is, of course, also possible to provide a filter medium belt here and to dispose a chamber for the filtered liquid below the filter medium belt. This chain flight assembly is likewise equipped with a drive motor, which transports the chain incrementally and continuously.

In a further refinement, a cleaning device for this unit may be arranged in the area of the discharge neck to increase the degree of dirt discharge.

The invention also relates to a dynamic overflow system or preseparator in a filter system for filtering coolants, in which the preseparator is a separate device disposed in the upper part of the filter system, and the preseparator is provided with an overflow device disposed in the area of a circulating belt of filter material which is coupled to a conveyor chain on both sides of the device, and the circulating belt is driven by a drive motor using sprocket wheels.

These and other features of the invention will become apparent, not only from a consideration of the claims, but also from the following specification and drawings.

BRIEF DESCRIPTION OF THE DRAWINGS

The invention will be described in further detail hereinafter with reference to illustrative embodiments shown in the accompanying drawing figures, in which.

DETAILED DESCRIPTION OF PREFERRED EMBODIMENTS

Figure 1:
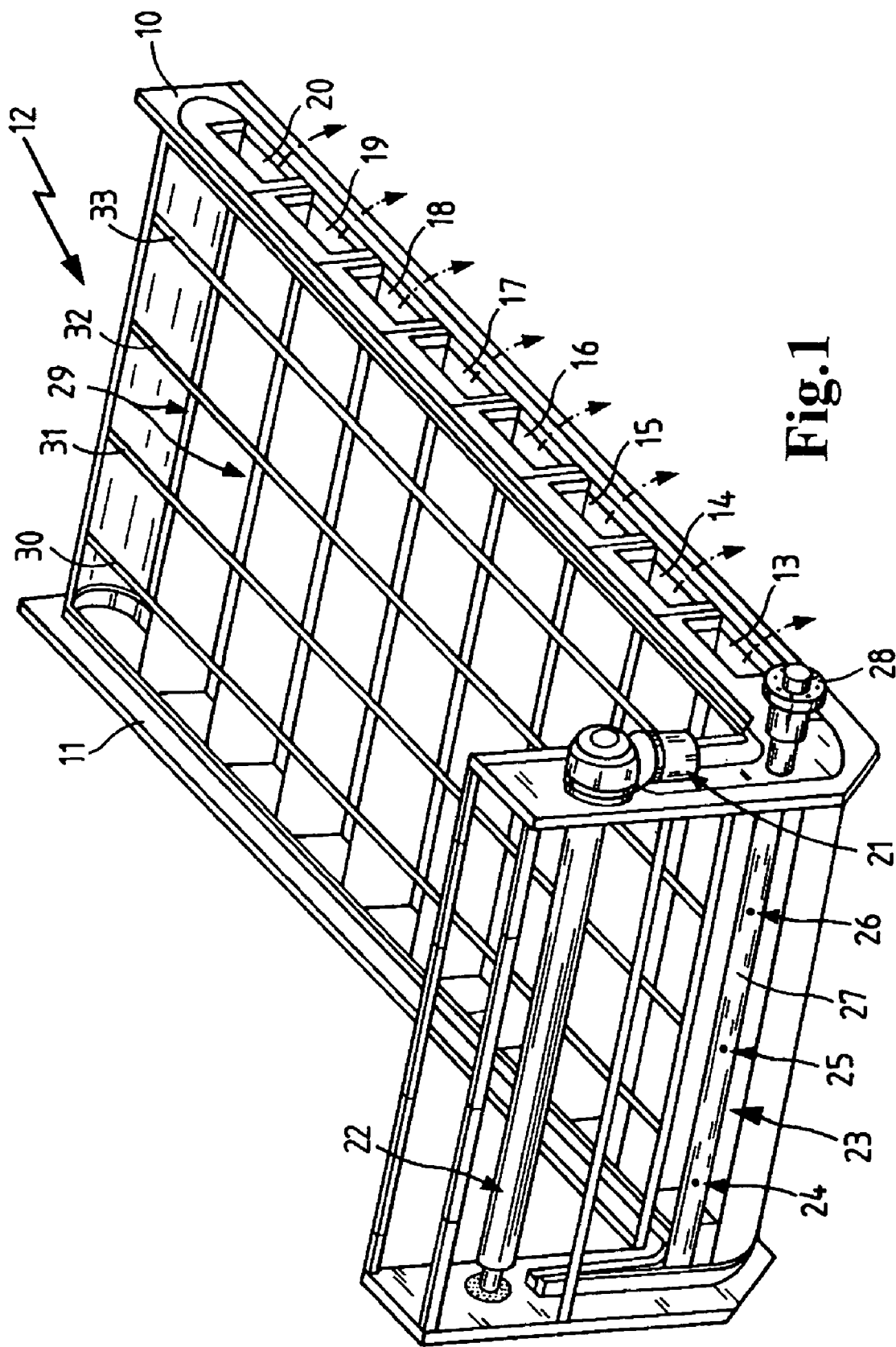
FIG. 1 shows an insert for a filter apparatus having a support structure adapted to receive a belt of filter medium.

FIG. 1 shows an insert having a frame 12 installed in a filter apparatus described in greater detail below with reference to FIG. 2 and comprising two side parts 10 and 11. Whereas the side part 11 is closed, the side part 10 is provided with openings 13 to 20. On the left, the side parts are bent upward at a right angle. Side part 10 has a drive motor 21 in the upper part of the bent-up portion, which drives a shaft 22 rotatably mounted in the side parts 10 and 11.

Also on the left, in the bent-up portion, is located a cleaning device 23 which is comprised of spray nozzles 24, 25 and 26 mounted on a common pipe 27. This pipe has a connecting flange 28 for supplying a cleaning liquid. A support frame 29 comprised of webs and support strips 30, 31, 32, 33 is located between the side parts. A belt of filter medium (not shown in FIG. 1) enclosing the frame 12 and driven by the drive motor 21 is adjacent the support frame 29 on both the top side and the bottom side. The cleaning device 23 is located within the belt of filter medium. The belt of filter medium creates a region between its top side and its bottom side, which communicates with the discharge outlet only via openings 13 to 20.

Figure 2:
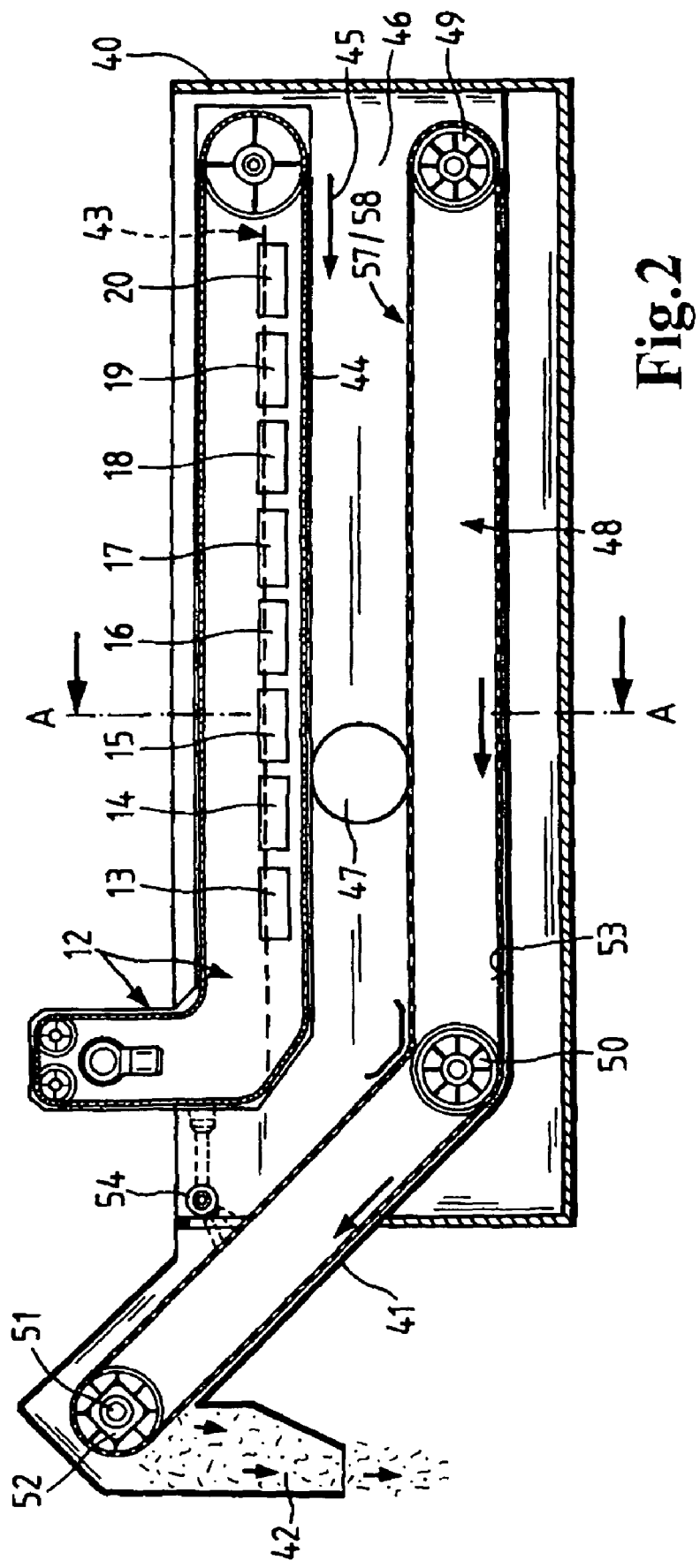
FIG. 2 is a side view of a filter apparatus in a sectional view.

FIG. 2 shows a filter apparatus in which the frame 12 shown in FIG. 1 is installed. This filter apparatus is comprised of a filter tank 40 having a box-shaped construction and a discharge neck 41 for discharging the dirt which collects in the filter tank. At its end, the discharge neck 41 has a chute 42 through which the dirt falls downwardly into a collecting basin (not shown). The frame 12 is located in the upper area within the filter tank 40. In this figure, like components are identified by the same reference numerals as in FIG. 1.

The frame is disposed slightly below the maximum liquid level. A belt 44 of filter material installed to circulate around the frame 12 moves in the direction indicated by arrow 45, i.e., the bottom side of the filter medium belt moves toward the discharge neck 41. An inlet opening 47 is provided in the sidewall 46 of the filter tank 40 for admitting dirty liquid. Furthermore located within the filter tank 40 is a chain flight assembly 48 comprising a end roller or reversing roller 49, an end roller or reversing roller 50 and a drive shaft 51 with a schematically indicated drive motor 52.

The chain flight assembly 48 comprises two circulating chains 57 and 58 (see also FIG. 3) disposed in the region of the sidewalls of the filter tank 40. Flight bars 55 and 56 are mounted between the chains—as shown in greater detail in FIG. 3. The liquid to be filtered flows in through the opening 47. It contains, on the one hand, dirt particles, which settle to the bottom and, on the other hand, chips with a very fine structure, which—if they are aluminum, magnesium or similar chips of other relatively low-density materials—float to the top.

Because of the belt of filter medium 44, the chips do not rise to the height of the liquid level 43, but only up to the belt of filter medium 44 and are carried along by the belt in transport direction toward the discharge neck 41. Thus, the belt of filter medium prevents the chips or coarse dirt from getting into the region between the top side and the bottom side. However, because the liquid level settles between these two belt sections, the liquid flows out laterally through the openings 13 to 20 shown in FIG. 1. These openings are provided with a suitable collecting devices so that the liquid cleaned in this unit can be supplied to another filter unit or directly into the filtered liquid system.

The chips transported toward the discharge neck become denser in the area on the left-hand side and, due to this densification, sink to the bottom 53 of the filter tank. The chips and the dirt which collect in the bottom 53 are then transported by the chain flight assembly 48 to the discharge neck and the chute 42.

The endless chain flight assembly 48 with the circulating chains 57 and 58 (see also FIG. 3) and the flight bars passes under a spray head 54 and is cleaned by a plurality of spray nozzles as needed.

Figure 3:
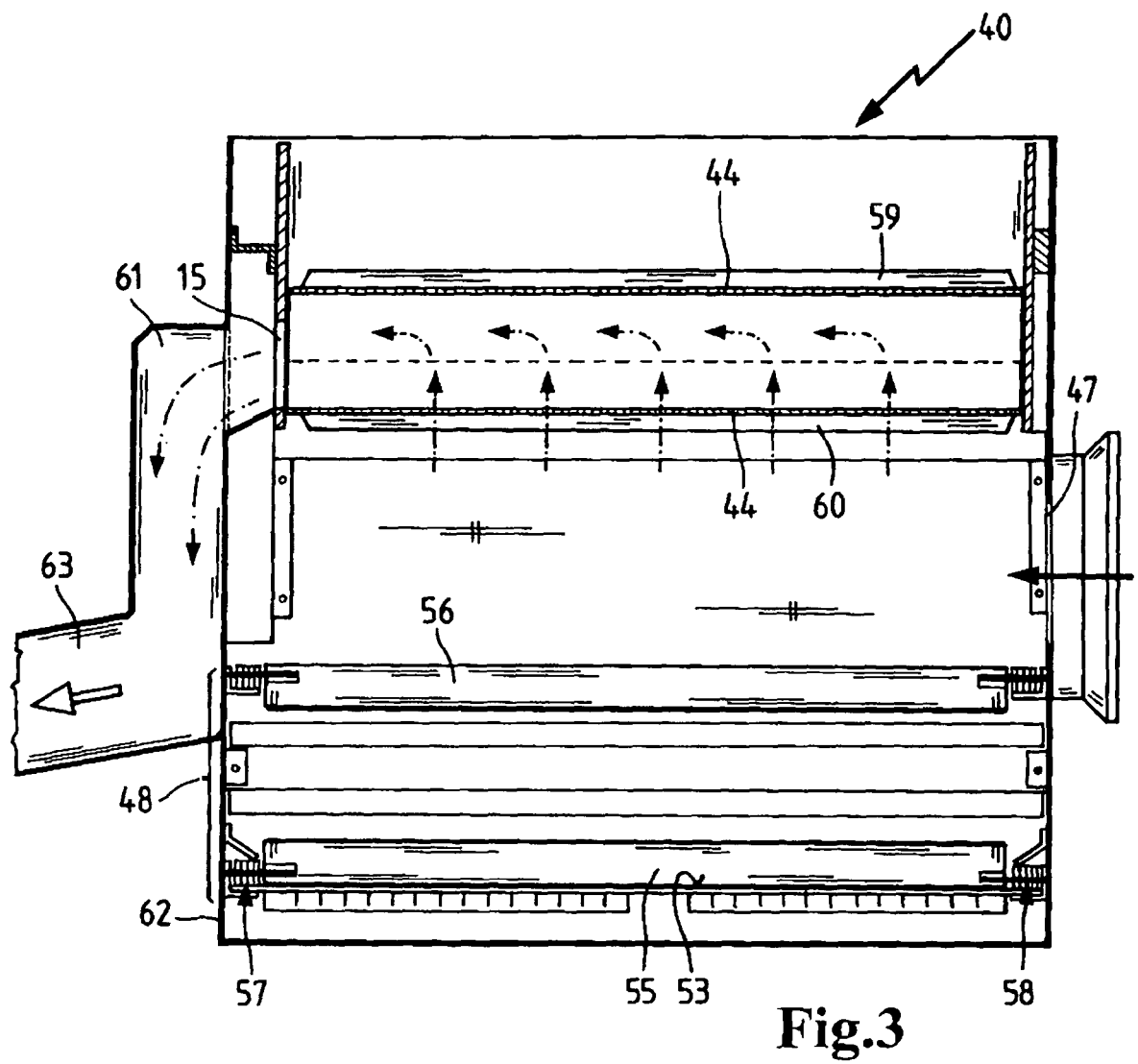
FIG. 3 is a sectional view taken along line A-A of FIG. 2.

FIG. 3 is a section taken along line A-A of FIG. 2. As already mentioned, the chain flight assembly 48 is equipped with flight bars 55 and 56. These flight bars are angled or flat rails, which are mounted between the conveyor chains 57, 58 and are moved by the conveyor chains. The flight bars directly contact the bottom 53 of the filter tank, so that any dirt which collects on the bottom is reliably discharged. The filter medium belt 44 also has flight bars 59, 60, which have a specific distance from each other, for example. They are preferably spaced apart in such a way that five to eight flight bars are located in the area of the bottom side of the filter medium belt 44. The openings 13 to 20 (opening 15 is shown in the section taken along line A-A) communicate with an outlet 61 in the sidewall 62 of the filter tank 40. This outlet 61 opens into a pipe 63 for the liquid to be discharged. The liquid to be filtered flows into the filter tank 40 through the opening 47 in the direction of the arrow and out of the filter tank through the openings 13 to 20 (see also FIGS. 1 and 2). The belt 44 of filter medium belt ensures that no unfiltered liquid is discharged through outlet 61, particularly no liquid containing floating components.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within ghe scope of the appended claims and equivalents thereof.

What is claimed is:

1. A filter apparatus comprising:
    a filter tank having an inlet for a liquid to be filtered and an outlet for filtered liquid;
    a frame arranged in said filter tank above said inlet, said frame comprising
        a pair of spaced apart side members;
    at least one overflow outlet opening which opens through one of said side members and which communicates with the filtered liquid outlet of the filter tank;
    an endless belt of filter medium adapted to circulate within the filter tank, said belt of filter medium being arranged on said frame between said side members such that a top segment of the filter medium belt passes above the at least one overflow outlet opening and a bottom segment of the filter medium belt passes below said at least one overflow outlet opening, and the side members and the top and bottom segments of the filter medium belt together define between them a filtered liquid zone,
    wherein said overflow openings are arranged such that liquid level in said filter tank settles between said top and bottom segments of said filter medium belt,
    wherein said filtered liquid is filtered only by said bottom segment; and
    flight bars provided along the belt of the filter medium, the flight bars being arranged substantially perpendicular to the movement direction of the belt of filter medium and serving to assist in transporting dirt separated from the filtered liquid,
    whereby the liquid to be filtered is introduced to the filter tank through the inlet, passes through the bottom segment of the belt into the filtered liquid zone,
    whereby the fluid is filtered, and flows from the filtered liquid zone through the at least one overflow outlet opening to the outlet for filtered liquid.

2. A filter apparatus according to claim 1, wherein the belt of filter medium is guided by a deflector to a cleaning device disposed above the liquid level, and a drive is provided for the belt of filter medium.

3. A filter apparatus according to claim 2, wherein said drive is arranged above the liquid level in the filter tank.

4. A filter apparatus according to claim 2, wherein the cleaning device comprises a plurality of spray nozzles mounted on a common spray head.

5. A filter apparatus according to claim 1, wherein a chain flight assembly is provided in the filter tank, said chain flight assembly serving to discharge dirt, which collects in the bottom of the filter tank upon separation from the filtered liquid, through a discharge neck.

6. A filter apparatus according to claim 5, wherein the chain flight assembly is provided with a drive motor arranged in the area of the discharge neck.

7. A filter apparatus according to claim 5, wherein a cleaning device comprising a spray head and a plurality of spray nozzles is provided for the chain flight assembly in the area of the discharge neck.

8. A filter apparatus according to claim 1, wherein the inlet for liquid to be filtered is connected to a source of dirty coolant/lubricant liquid from a machining operation.

* * * * *